United States Patent [19]

Miller

[11] 4,372,584

[45] Feb. 8, 1983

[54] COUPLING FOR COUPLING TUBULAR ELEMENTS

[75] Inventor: Jack E. Miller, Houston, Tex.

[73] Assignee: Big Inch Marine Systems, Inc., Houston, Tex.

[21] Appl. No.: 79,218

[22] Filed: Sep. 26, 1979

[51] Int. Cl.³ .............................................. F16L 35/00
[52] U.S. Cl. .................................... 285/18; 285/184;
      285/315; 285/336; 285/320; 285/DIG. 21
[58] Field of Search ....... 285/420, 315, 316, DIG. 21,
      285/184, 320, 18, 336, 322, 323, 263, 311

[56] References Cited

U.S. PATENT DOCUMENTS

| | | | |
|---|---|---|---|
| 2,861,821 | 11/1958 | Harter | 285/320 X |
| 3,050,117 | 8/1962 | Haeber et al. | 285/DIG. 21 |
| 3,165,334 | 1/1965 | Faccou | 285/263 |
| 3,222,088 | 12/1965 | Haeber | 285/316 X |
| 3,321,217 | 5/1967 | Ahlstone | 285/315 X |
| 3,628,812 | 12/1971 | Larralde | 285/322 |
| 3,712,646 | 1/1973 | Bergougnoux | 285/315 |
| 3,841,665 | 10/1974 | Caput | 285/315 X |
| 3,860,271 | 1/1975 | Rodgers | 285/97 |
| 4,195,865 | 4/1980 | Martin | 285/311 X |

FOREIGN PATENT DOCUMENTS

| | | | |
|---|---|---|---|
| 821890 | 11/1951 | Fed. Rep. of Germany . | |
| 2313624 | 12/1976 | France | 285/137 R |
| 556010 | 9/1943 | United Kingdom . | |
| 1085273 | 9/1967 | United Kingdom | 285/DIG. 21 |

OTHER PUBLICATIONS

Big-Inch Marine Systems Brochure.

Primary Examiner—Dave W. Arola
Attorney, Agent, or Firm—Arnold, White & Durkee

[57] ABSTRACT

A coupling for coupling two pipe sections in sealed relationship, the coupling comprising a male member for connection to one pipe section, a female member for connection to a second pipe section, a locking member located on the male member, the locking member comprising a locking sleeve having a plurality of circumferentially spaced bendable locking fingers which extend integrally and axially from the locking sleeve, a displacement piston mounted on the male member for displacing the free end portions of the locking fingers radially outwardly, and a locking recess in the female member for receiving the locking fingers when displaced by the displacement means while the members are in mating engagement, the locking recess defining a bearing surface against which the free ends of the locking fingers will bear during displacement to draw the two members into sealing engagement with each other, the bearing surface being shaped to allow displacement of the locking fingers into and over center locking position. The coupling may include a swivel section pivotally mounted in the female member, with the male member and swivel section having complementary co-operating surfaces to engage when the male and female members are sealingly engaged to locate the swivel section against further pivotal displacement.

21 Claims, 3 Drawing Figures

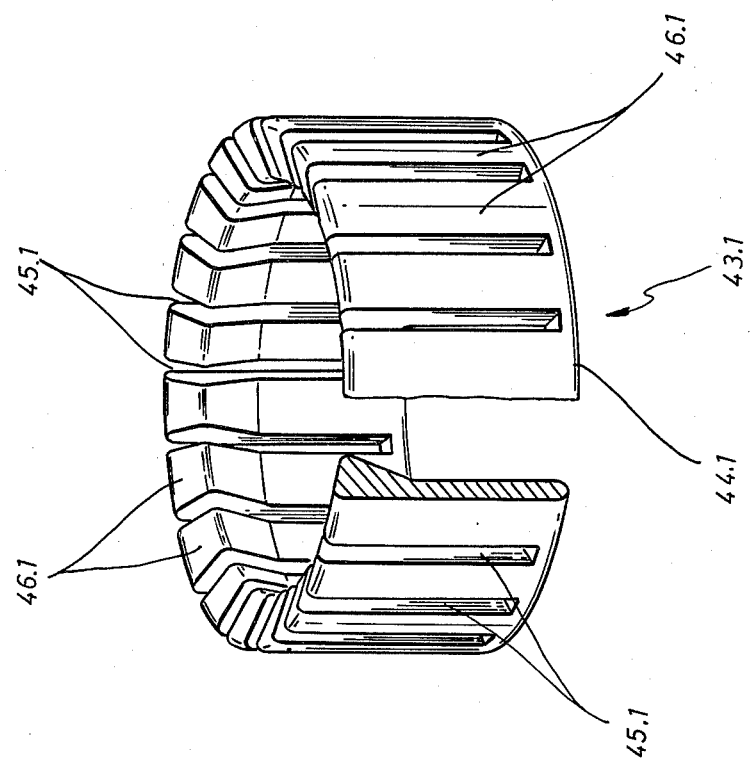

COUPLING FOR COUPLING TUBULAR ELEMENTS

This invention relates to a coupling for coupling tubular elements. More particularly, this invention relates to a coupling for coupling two tubular elements in sealed relationship.

According to the invention there is provided a coupling for coupling two tubular elements in sealed relationship, the coupling comprising: first and second tubular members in the form of complementary male and female members for mating with each other, a locking member associated with the first member, the locking member comprising a locking sleeve having a plurality of circumferentially spaced displaceable locking fingers which extend generally axially from the locking sleeve, displacement means associated with one of the members for displacing the free end portions of the locking finger transversely to the axis of the locking sleeve, and a locking recess in the second member for receiving the locking fingers when displaced by the displacement means while the members are in mating engagement, the locking recess defining a bearing surface along which the free ends of the locking fingers will move and against which the free ends of the locking fingers will bear during displacement to draw the two members into sealing engagement with each other.

The locking fingers may conveniently extend integrally from the locking sleeve.

The bearing surface may conveniently be shaped to allow displacement of the locking fingers into an over-center locking position to combat release of the locking fingers after displacement.

The male and female tubular members may include complementary abutment surfaces which are positioned to be marginally spaced from each other when the tubular members are initially mated, and to be drawn into firm engagement with each other during displacement of the locking fingers.

Conveniently, however, at least one of the members may include an annular sealing ring to effect a sealing engagement with the other member when the members have been drawn into sealing engagement with each other.

While the displacement means may be of any conventional type, in an embodiment of the invention the displacement means may comprise displaceable piston means having a camming surface to cooperate with the locking fingers to displace them.

In an example of this embodiment of the invention the displacement means may comprise an annular piston sleeve slidably mounted on one of the members, and an annular cylinder for receiving a fluid under pressure to effect displacement of the piston sleeve.

The camming surface of the piston means may conveniently be axially curved to combat significant variation in the driving force which would be required for displacing the piston means during use.

In an embodiment of the invention the camming surface of the piston means may have a seating surface portion on which the free end portions of the locking fingers can seat in their fully displaced position to combat the locking fingers being able to exert a component of force on the piston means which would tend to displace the piston means towards its initial position.

The first tubular member may conveniently be the male member, with the locking member and displacement means being mounted on the male member.

In an embodiment of the invention the one member, which is in the form of a female member, may include a tubular swivel section which is pivotally located in the female member to permit pivotal displacement for varying the inclination of the axis of the swivel section to the axis of the female member.

In this embodiment of the invention, the swivel section may have an outer end portion for connection to a tubular element to thereby connect the female member to such a tubular element, and may have an inner end portion positioned to cooperate with an inner end portion of the male member when mated with the female member, the cooperation being such as to permit pivotal displacement of the swivel section when the male and female members are mated but to restrain such pivotal displacement once the members have been drawn into sealing engagement.

Conveniently, in this embodiment, the inner end portion of the swivel section may define a concave segmental spherical surface and the inner end portion of the male member may define a complementary convex segmental spherical surface to cooperate with the surface of the swivel section.

At least one sealing ring may conveniently be mounted on one of the surfaces to engage sealingly with the remaining surface when the surfaces have been drawn into sealing engagement with each other. Alternatively, for example, one of the surfaces may be provided with one or more sealing flanges which are shaped to penetrate the other surface when the surfaces are drawn into sealing engagement to thereby effect a seal between the two surfaces.

The locking member may conveniently be formed by forming or machining a tubular sleeve and then providing circumferentially spaced slots in the sleeve which extend generally axially from a first end of the sleeve and which terminate short of the second end of the sleeve. The locking fingers are thus defined between adjacent pairs of slots and the locking sleeve is defined between the inner ends of the slots and the second end of the sleeve.

This provides the advantage of ease and economy of manufacture since the number of individual machined parts is limited. This provides the further advantage that the locking fingers are integral with the locking sleeve and are thus maintained in their required initial position by the locking sleeve prior to use.

The locking fingers and locking sleeve can thus be handled as a unit and can readily be fitted in position on one of the members without the need to assemble a plurality of separate locking components.

The tubular sleeve locking member from which the locking sleeve and locking fingers are formed may have its outer surface tapered along its length, but may conveniently have a cylindrical outer surface.

While the coupling of this invention may have application in regard to the coupling of various types of tubular elements, it may have particular application in regard to the coupling of pipeline sections in environments where it would be difficult or hazardous to use conventional types of couplings, or where conventional types of couplings would be ineffective.

The coupling of this invention may therefore have particular application in regard to the coupling of pipeline sections in subsea environments such as, for example, pipeline sections used during laying or repairing of underwater pipelines for the transmission of oil, gas, or the like.

The tubular members of the coupling may be connected to tubular elements to be coupled by any conventional means.

BRIEF DESCRIPTION OF THE DRAWINGS

Embodiments of the invention are now described by way of example with reference to the accompanying drawings.

In the drawings:

FIG. 3 shows a three dimensional view of the locking member of the couplings of FIGS. 1 and 2.

DESCRIPTION OF THE PREFERRED EMBODIMENTS

Figure 1:
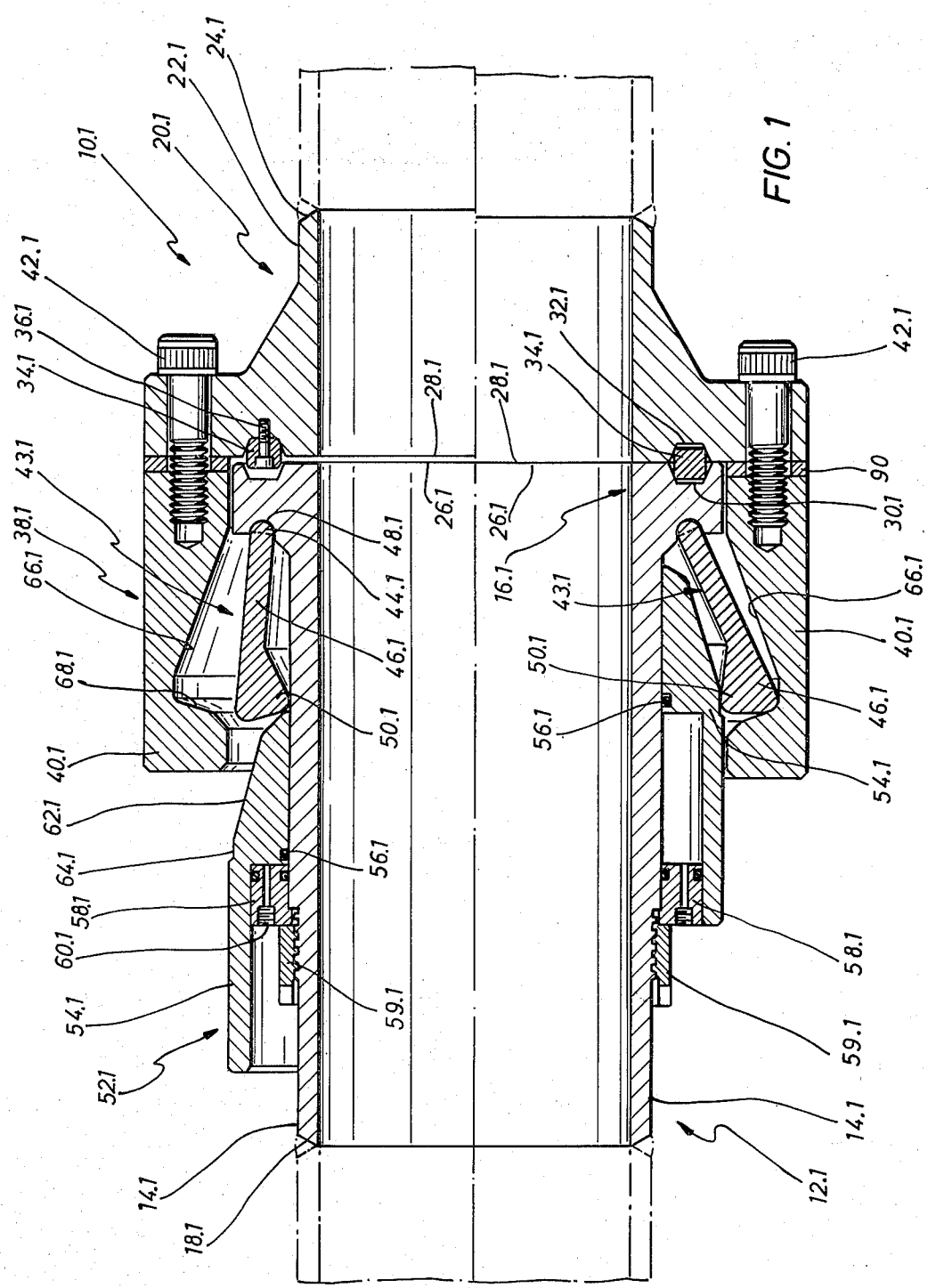
FIG. 1 shows a sectional side elevation of one embodiment of a coupling in accordance with this invention for use in coupling under sea oil pipeline sections, with the part of the drawing above the centerline showing the tubular members of the coupling in their initial mated condition, and with the part of the drawing below the centerline showing the tubular elements of the coupling in sealed engagement.

With reference to FIGS. 1 and 3 of the drawings, reference numeral 10.1 refers generally to a coupling for coupling two under sea oil pipeline sections in sealed relationship.

The coupling 10.1 comprises a first tubular member 12.1 which is in the form of a male member, and which has an outer end 14.1 and an inner end 16.1.

The outer end 14.1 is shown having a weld bevel 18.1 to permit the outer end 14.1 to be connected to a pipeline section by welding.

The coupling 10.1 further comprises a second tubular member 20.1 which is in the form of a female member for mating with the male member 12.1.

The female member 20.1 has an outer end 22.1 with a weld bevel 24.1 for welding the outer end 22.1 to a pipeline section to connect the female member 20.1 to the pipeline section.

The male member 12.1 has an axially directed annular abutment surface 26.1 at its inner end 16.1, while the female member 20.1 has a complementary, axially directed abutment surface 28.1 to cooperate with the abutment surface 26.1.

The abutment surfaces 26.1 and 28.1 have corresponding annular grooves 30.1 and 32.1.

An annular metal sealing ring 34.1 is mounted in the groove 30.1 by means of circumferentially spaced bolts 36.1.

The female member 20.1 has an annular securing portion 38.1 which extends axially from the abutment surface 28.1 to define the socket of the female member 20.1 for receiving the male member 12.1.

The annular securing portion 38.1 is in the form of a removable annular release flange 40.1 which is bolted onto the female member 20.1 by means of circumferentially spaced bolts 42.1.

The release flange 40.1 can be unbolted when required to permit uncoupling of the coupling 10.1 after it has been coupled.

The coupling 10.1 further includes a locking member 43.1 which is located on the male member 12.1. The locking member 43.1 comprises a locking sleeve 44.1 and a plurality of circumferentially spaced displaceable locking fingers 46.1 which extend integrally and axially from the locking sleeve 44.1.

The locking sleeve 44.1 and locking fingers 46.1 are formed by machining a tubular sleeve 43.1 having a cylindrical outer surface out of a suitable metal or metal alloy. Thereafter circumferentially spaced slots 45.1 are provided in the tubular sleeve which extend axially from a first end of the sleeve and which terminate short of the second end of the sleeve. This can be seen particularly in FIG. 3.

The slots may be formed in any conventional manner such as, for example, by saw cutting.

The locking fingers 46.1 are thus defined between adjacent pairs of circumferentially spaced slots, while the locking sleeve 44.1 is defined between the inner ends of the slots and the second end of the tubular sleeve.

The method of manufacture provides the advantage of ease and economy of manufacture since the number of individual machined parts is limited. The only machining required is to machine the tubular sleeve. It provides the further advantage that the locking fingers 46.1, extending integrally from the locking sleeve 44.1, are held in their required positions by the locking sleeve 44.1. The locking sleeve 44.1 and locking fingers 46.1 can therefore be handled as a unit and can easily be fitted to the male member 12.1 without the need to assemble a number of components and maintain them in their correct position during fitting.

The male member 12.1 includes an annular pivot recess 48.1 wherein the locking sleeve 44.1 is pivotally located.

Each locking finger 46.1 has a radially inwardly directed displacement shoulder 50.1.

The coupling 10.1 further includes displacement means 52.1 which is mounted on the male member 12.1 for displacing the free end portions of the locking fingers 46.1 radially outwardly for coupling the male and female members 12.1 and 20.1.

The displacement means 52.1 comprises an annular piston sleeve 54.1 which is slideably mounted on the male member 12.1. An annular sealing ring 56.1 provides a sealing engagement between the annular piston sleeve 54.1 and the outer surface of the male member 12.1.

The displacement means 52.1 further comprises an annular cylinder ring 58.1 and an annular, internally threaded locating shoulder 59.1 which is located on the male member 12.1 by having its threads engaged with complementary threads provided on the male member 12.1.

The cylinder ring 58.1 includes a hydraulic fluid port 60.1 for connection to a source of hydraulic fluid under pressure.

The piston sleeve 54.1 has a camming surface 62.1 to cooperate with the displacement shoulders 50.1 of the locking fingers 46.1, to displace the locking fingers 46.1 radially outwardly during axial displacement of the piston sleeve 54.1.

The camming surface 62.1 terminates in a seating surface 64.1 which is parallel to the axis of the male member 12.1, for the displacement shoulders 50.1 to seat on when the piston sleeve 54.1 has been displaced fully as shown in the lower half of FIG. 1.

The annular securing portion 38.1 is shaped internally to define a locking recess 66.1 for receiving the locking fingers 46.1 when they are displaced radially outwardly.

The locking recess 66.1 defines a bearing surface 68.1 against which the free ends of the locking fingers 46.1 will bear during radial displacement of the locking fingers 46.1 to draw the male and female members 12.1 and 20.1 into sealing engagement with each other.

The bearing surface 68.1 is shaped in relation to the pivot recess 48.1 and the arc of displacement of the locking fingers 46.1 so that during displacement of the locking fingers 46.1 the male and female members 12.1 and 20.1 will be drawn towards each other by the free ends of the locking fingers 46.1 bearing against and being displaced along the bearing surface 68.1 until the locking fingers 46.1 provide their maximum biasing effect at a central position, whereafter the locking fingers 46.1 can be displaced marginally further into an over center locking position to combat release of the locking fingers by changing the impending direction of motion from radially inwardly to radially outwardly.

In use, for coupling oil pipeline sections, the male and female members 12.1 and 20.1 may be connected to such pipeline sections by welding, by cold forging, or by any other conventional means.

Thereafter, a hydraulic fluid line may be connected to the hydraulic fluid port 60.1, the members may be lowered into their operative position and the members may be mated initially.

By applying hydraulic fluid under pressure through the port 60.1 the piston sleeve 54.1 will be displaced axially along the male member 12.1.

During such axial displacement the camming surface 62.1 will engage with and cooperate with the inwardly directed surfaces of the displacement shoulders 50.1 to displace the locking fingers 46.1 transversely to the axis of the locking member 43.1 and thus radially outwardly. During such displacement, as hereinbefore described, the free ends of the locking fingers 46.1 will engage with and be displaced along the bearing surface 68.1. During such displacement, the male and female members 12.1 and 20.1 will be drawn towards each other to compress the metal sealing ring 34.1 and then to draw the abutment surfaces 26.1 and 28.1 into engagement with each other thereby preloading the coupling fully when the locking fingers 46.1 are in their central position.

Upon further displacement of the piston sleeve 54.1, the locking fingers 46.1 will be displaced marginally into their over center positions and into contact with the annular wall defining the locking recess 66.1.

In this position, the displacement shoulders 50.1 bear against the seating surface 64.1 so that the locking fingers 46.1 cannot exert any radially inwardly directed force which can have the effect of tending to return the piston sleeve 54.1 to its initial position.

While the preloading of the coupling 10.1 is released marginally during displacement of the locking fingers 46.1 beyond their central positions and into their over center positions, the release will be sufficiently marginal to maintain the pre-load and to maintain a sealing engagement between the abutment surfaces 26.1 and 28.1 thereby providing a sealing engagement between the coupled pipe sections.

The hydraulic port may then be sealed.

For subsequent uncoupling of the coupling 10.1 the bolts 42.1 may be removed to allow removal of the release flange 40.1.

Figure 2:
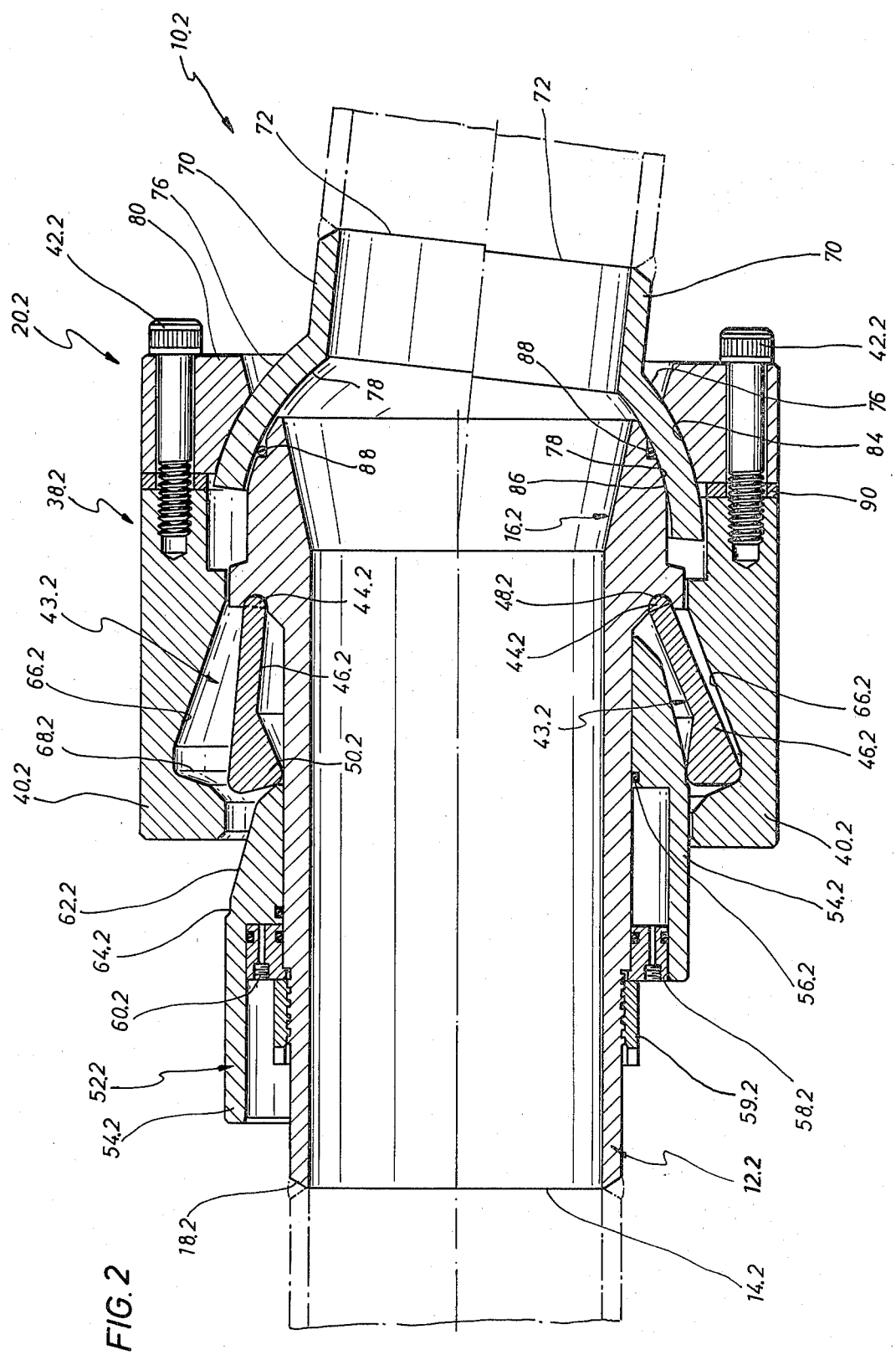
FIG. 2 shows a corresponding view to that off FIG. 1, of an alternative embodiment of a coupling in accordance with this invention, again with the part above the centerline showing the tubular members of the coupling in their initial mated condition, and the part below the centerline showing the tubular members of the coupling in sealing engagement.

With reference to FIG. 2 of the drawings, reference numeral 10.2 refers generally to an alternative embodiment of a coupling in accordance with this invention for coupling two oil pipeline sections in sealed relationship.

The coupling 10.2 corresponds substantially with the coupling 10.1 and corresponding parts of the coupling 10.2 are indicated by corresponding reference numerals as used in relation to the coupling 10.1 except that the suffix "0.2" has been substituted for the suffix "0.1".

In the coupling 10.2 the female member 20.2 includes a tubular swivel section 70 which is pivotally located in the female member 20.2 to permit pivotal displacement for varying the inclination of the axis of the swivel section 70 to the axis of the female member 20.2.

The swivel section 70 has an outer end portion 72 with a weld bevel 74 to allow the swivel section 70 to be connected to a pipe section, thereby connecting the female member 20.2 to the pipe section.

The swivel section 70 has corresponding convex and concave segmental spherical surfaces 76 and 78.

The swivel section 70 is pivotally located in the female member 20.2 by the female member 20.2 being in the form of an annular swivel ring 80 which is fixed to the annular securing portion 38.2 by means of the bolts 42.2.

The annular swivel ring 80 has a concave segmental spherical surface 84 complementary to the surface 76 to permit relative pivotal displacement of the swivel section 70 and the female member 20.2.

The male member 12.2 has a convex segmental spherical surface 86 about the outer periphery of its inner end 16.2, which is complementary to the surface 78 to cooperate with the surface 78 when the inner end 16.2 of the male member 12.2 is mated with the female member 20.2 as shown in the drawing.

The convex surface 86 is provided with an annular, V-section groove 88 wherein a circular section metal O-ring is located.

The coupling 10.2 would tend to have particular application where misaligned pipe sections are to be coupled.

With the coupling in its initial mated condition the outer end 14.2 may be connected to one pipe section while the outer end portion 72 may be connected to the other pipe section. Because the swivel section 70 is able to swivel, the swivel section can be swiveled to accommodate misalignment of the pipe sections.

Thereafter the locking fingers 46.2 may be displaced radially outwardly in the manner described with reference to FIG. 1 to compress the swivel section 70 between the surface 84 of the annular swivel ring 80 and the surface 86 of the male member 12.2 to provide a sealing engagement between these surfaces, and to provide a sealing compression of the sealing ring 88.

Therefore, in the coupled condition of the coupling 10.2, the swivel section 70 will be fixed against any further pivotal displacement and the pipe section will have been coupled in a sealing engagement.

The camming surfaces 62.1 and 62.2 may be curved along their axial lengths to combat signficant variation in the driving force which would be required for displacing the piston sleeve 54.1 or 54.2 during use.

In both FIGS. 1 and 2, the female members 20.1 and 20.2 include annular spacer washers 90 which are provided between the female members 20.1 and 20.2 and the annular securing portions 38.1 and 38.2.

In use, the spacer washers 90 are formed with axial thicknesses in excess of that which would be required.

The components are assembled without the spacer washers and a nominal bolt torque is then applied to the bolts 42.1 or 42.2, as the case may be.

Thereafter, the distances between the essential operative components are measured and a determination is made in regard to the axial thickness required for the spacer washer 90 to provide the required interference and pre-loading for the coupling 10.1 or 10.2, as the case may be.

A spacer washer 90 is then ground down to provide the requisite axial thickness, and is fitted to the female member so that, in use, the coupling will provide the required interference and pre-loading characteristics.

The spacer washer 90 therefore provides the advantage that it provides a means for compensating for tolerance errors in the manufacture of the components of the coupling.

The production tolerances of the coupling components do therefore not have to be controlled so finely and accurately as to significantly influence production costs of the coupling components. It will be appreciated that the same objective can be achieved by employing a plurality of thin spacer washers, and then using a sufficient member together to provide a required axial thickness.

The embodiments of the invention as illustrated in the drawings provide the advantage that the locking sleeves and locking fingers 44 and 46 constitute a single unit 43 which can be manufactured and fitted for use in an effective and economical manner.

The illustrated embodiments provide the further advantages that an effective seal can be made between the two tubular members, that the members can be pre-loaded during coupling to ensure that the seal will be maintained under most operating conditions, and that reliance is not placed on frictional characteristics to maintain the preload of the coupling.

The embodiments as illustrated in the drawings provide the further advantage that the locking fingers provide a non-linear mechanical advantage thereby allowing for relatively constant displacement loads for displacing the piston sleeve over the full range of travel of the sleeve. In particular, the mechanical advantage will increase as the locking fingers are displaced until, when the locking fingers exhibit their maximum resistance to displacement near their final position, the maximum mechanical advantage will be provided. This will therefore avoid the need for a substantially increased displacement load during displacement of the locking fingers near their final position.

Furthermore, because the free end portions of the locking fingers have a greater diameter in their expanded condition than the pipe sections coupled by means of the coupling, the coupling will provide more than adequate strength for effective coupling.

The embodiments of the invention as illustrated in the drawings can therefore provide the following essential advantages: a positive locking capability; the capability to preload to pipe yield strength; and that joint integrity does not rely on friction.

The components of the coupling of this invention may be made of various materials. In an embodiment of the invention, however:

(1) the locking member may be made of a high strength heat-treated alloy steel such as, for example AISI 4140;

(2) the male and female members may be made of AISI 4130 steel; and (3) the piston sleeve may be made of a mild steel such as, for example, AISI 1018.

Applicant believes, however, that these steels will probably give a higher strength than will be required in practice.

What is claimed is:

1. A coupling for coupling two tubular elements, the coupling comprising:

first and second tubular members in the form of complementary male and female members for mating with each other, the members having engagement surfaces to be engaged with each other when the members are engaged to limit relative axial movement in one direction, a locking member axially located by locating means on the first member, the locking member comprising an annular locking sleeve having a plurality of circumferentially spaced displaceable locking fingers which are integral with and comprise a continuous extension of the material of the locking sleeve, and which extend generally axially from the locking sleeve, displacement means associated with one of the members for displacing the free end portions of the locking fingers transversely to the axis of the locking sleeve, and a locking recess in the second member for receiving the locking fingers when displaced by the displacement means while the members are in mating engagement, the locking recess defining a bearing surface along which the free ends of the locking fingers will move and against which the free ends of the locking fingers will bear during displacement, the bearing surface being inclined to the axis of the coupling for the locking fingers to be axially compressed between the bearing surface and the locating means and thus to draw the engagement surfaces of the two members into engagement with each other when the free ends of the locking fingers are displaced along the bearing surface.

2. A coupling according to claim 1, in which the bearing surface is shaped to allow displacement of the locking fingers into an over-center locking position to combat release of the locking fingers.

3. A coupling according to claim 1, in which the displacement means comprises displaceable piston means having a camming surface to cooperate with the locking fingers to displace them.

4. A coupling according to claim 3, in which the displacement means comprises an annular piston sleeve slidably mounted on one of the members, and an annular cylinder for receiving a fluid under pressure to effect displacement of the piston sleeve.

5. A coupling according to claim 3, in which the camming surface has a seating surface portion on which the free end portions of the locking fingers will seat in their fully displaced position.

6. A coupling according to claim 1, in which the first tubular member is the male member, and in which the locking member and displacement means are mounted on the male member.

7. A coupling according to claim 1, in which the one member which is in the form of a female member includes a tubular swivel section which is pivotally located in the female member to permit pivotal displacement for varying the inclination of the axis of the swivel section to the axis of the female member, the swivel section having an outer end portion for connection to a tubular element to connect the female member to such a tubular element, and having an inner end portion on which the engagement surface of the female member is provided to cooperate with the engagement surface of the male member on an inner end portion of the male member when mated with the female member, the engagement surfaces being adapted to be drawn into engagement with each other to restrain pivotal displacement once the members have been drawn into engagement.

8. A coupling according to claim 7, in which the inner end portion of the swivel section defines a concave segmental spherical surface and the inner end portion of the male member defines a complementary convex segmental spherical surface to cooperate with the surface of the swivel section.

9. A coupling according to claim 1, 6, 7 or 8, in which the one member which is in the form of a female member, comprises an annular securing portion which is removably secured to a remaining portion of the female member, the annular securing portion including at least that portion of the locking recess which defines the bearing surface, and the annular securing portion being removable to permit uncoupling of the coupling after the two members have been drawn into engagement.

10. A coupling according to claim 9, in which the female member includes a spacer washer located between the annular securing portion and the remaining portion, the spacer washer having a predetermined axial thickness to axially space the securing portion and the remaining portion a predetermined axial distance for providing a selected interference and pre-loading between the two members when they are drawn into engagement.

11. A coupling according to claim 1 or 7, in which one tubular member comprises two portions which are axially adjustable relatively to each other for providing a selected interference and preloading between the two tubular members when they are drawn into engagement.

12. A coupling according to claim 11, in which the female member comprises two portions, the one portion comprising an annular securing portion which is axially adjustable relatively to the remaining portion of the female member, the annular securing portion including that portion of the locking recess which defines the bearing surface.

13. A coupling according to claim 12, including a spacer washer positionable between the annular securing portion and the remaining portion of the female member, the spacer washer having a predetermined axial thickness to axially space the annular securing portion and the remaining portion a predetermined axial distance when the two portions are secured together with the spacer washer in position between them, to provide a predetermined interference between the free ends of the locking fingers and the bearing surface and thus a predetermined preloading between the two members when drawn into engagement.

14. A coupling for coupling two tubular elements, the coupling comprising:
first and second tubular members in the form of complementary male and female members for mating with each other, the members having complementary surfaces to be engaged with each other for limiting relative axial movement in one direction,
a locking member axially located on the first member by engaging with radially extending means on the first member, the locking member comprising a locking sleeve having a plurality of circumferentially spaced displaceable locking fingers which extend generally axially from the locking sleeve, each locking finger being a continuous extension of the material of the sleeve,
displacement means associated with one of the members for displacing the free end portions of the locking fingers transversely to the axis of the locking sleeve, and
a locking recess in the second member for receiving the locking fingers when displaced by the displacement means while the members are in mating engagement, the locking recess defining a bearing surface along which the free ends of the locking fingers will move and against which the free ends of the locking fingers will bear during displacement to provide for an axial compressive force on the locking fingers to draw the complementary surfaces of the two members into engagement with each other.

15. A coupling according to claim 14, in which the locking member is a one-piece member formed by providing axially extending slots at circumferentially spaced intervals in a tubular sleeve, the slots extending from one end of the tubular sleeve and terminating short of the opposed end of the sleeve to define the annular locking sleeve between the inner ends of the slots and the second end of the tubular sleeve, and to define the locking fingers between adjacent pairs of circumferentially spaced slots.

16. A coupling for coupling two tubular elements, the coupling comprising:
first and second tubular members in the form of complementary male and female members for mating with each other, the members having abutment surfaces to be engaged with each other to limit relative movement of the members in one direction,
a locking member associated with the first member, the locking member comprising an annular locking sleeve having a plurality of circumferentially spaced displaceable locking fingers which are integral with and which extend generally axially from the locking sleeve, the first member having an axially directed annular pivot recess wherein the locking sleeve is axially located against axial displacement in one direction relatively to the first member,
displacement means associated with one of the members for displacing the free end portions of the locking fingers transversely to the axis of the locking sleeve, and
a locking recess in the second member for receiving the locking fingers when displaced by the displacement means while the members are in mating engagement, the locking recess defining a bearing surface along which the free ends of the locking fingers will move and against which the free ends of the locking fingers will bear during displacement to axially compress the locking member between the bearing surface and the pivot recess and thus draw the abutment surfaces of the two members into engagement with each other.

17. A coupling for coupling two tubular elements, the coupling comprising:

first and second tubular members in the form of complementary male and female members for mating with each other, each member having a surface to be engaged with the surface of the other member to limit relative axial movement in one direction, a locking member axially located on the first member against axial displacement in at least one direction relatively to the first member by means on the first member, the locking member comprising a locking sleeve having a plurality of circumferentially spaced displaceable locking fingers which extend generally axially from the locking sleeve, displacement means associated with one of the members for displacing the free end portions of the locking fingers transversely to the axis of the locking sleeve, and a locking recess in the second member for receiving the locking fingers when displaced by the displacement means while the members are in mating engagement, the locking recess defining a bearing surface along which the free ends of the locking fingers will move and against which the free ends of the locking fingers will bear during displacement, the bearing surface being inclined to the axis of the second member for the locking fingers to draw the surfaces of the two members into engagement with each other when the free ends of the locking fingers are displaced along the bearing surface, and the bearing surface being shaped to allow displacement of the locking fingers into an over-center locking position to combat release of the locking fingers.

18. A coupling for coupling two tubular elements, the coupling comprising:

first and second tubular members in the form of complementary male and female members respectively for mating with each other, the members having opposed surfaces to be engaged with each other to limit relative movement in one direction, a locking member axially located on the male member against axial displacement in at least one direction relatively to the male member by locating means of the male member, the locking member comprising a locking sleeve having a plurality of circumferentially spaced displaceable locking fingers which extend generally axially from the locking sleeve, displacement means associated with the male member for displacing the free end portions of the locking fingers outwardly transversely to the axis of the locking sleeve, and a locking recess in the female member for receiving the locking fingers when displaced by the displacement means while the members are in mating engagement, the locking recess defining a bearing surface along which the free ends of the locking fingers will move and against which the free ends of the locking fingers will bear during displacement, the bearing surface being inclined to the axis of the member for the locking fingers to draw the opposed surfaces of the two members into engagement with each other when the free ends of the locking fingers are displaced along the bearing surface.

19. A coupling for coupling two tubular elements, the coupling comprising:

first and second tubular members in the form of complementary male and female members for mating with each other, the members having complementary surfaces to be engaged with each other for limiting relative axial movement in one direction, a locking member axially located on the first member against axial displacement in at least one direction relatively to the first member by means on the first member, the locking member comprising a locking sleeve having a plurality of circumferentially spaced displaceable locking fingers which extend generally axially from the locking sleeve, displacement means associated with one of the members for displacing the free end portions of the locking fingers transversely to the axis of the locking sleeve, and a locking recess in the second member for receiving the locking fingers when displaced by the displacement means while the members are in mating engagement, the locking recess defining a bearing surface along which the free ends of the locking fingers will move and against which the free ends of the locking fingers will bear during displacement, the bearing surface being inclined to the axis of the member for the locking fingers to draw the surfaces of the two members into engagement with each other when the free ends of the locking fingers are displaced along the bearing surface, the member which comprises the female member including a tubular swivel section which is pivotally located in the female member to permit pivotal displacement for varying the inclination of the axis of the swivel section to the axis of the female member, the swivel section having an outer end portion for connection to a tubular element to connect the female member to such a tubular element, and having an inner end portion on which the surface of the female member is provided to cooperate with the complementary surface on an inner end portion of the male member when mated with the female member, the cooperation of the surfaces being such as to permit relative pivotal displacement and thus pivotal displacement of the swivel section when the male and female members are mated but to restrain pivotal displacement once the members and the complementary surfaces have been drawn into firm engagement.

20. A coupling for coupling two tubular elements, the coupling comprising:

first and second tubular members in the form of complementary male and female members for mating with each other, the members having surfaces which are to be engaged to limit relative axial movement in one direction, a locking member axially located on the first member against axial displacement in one direction relatively to the first member by locating means, the locking member comprising a locking sleeve having a plurality of circumferentially spaced displaceable locking fingers which extend generally axially from the locking sleeve, displacement means associated with one of the members for displacing the free end portions of the locking fingers transversely to the axis of the locking sleeve, a locking recess in the second member for receiving the locking fingers when displaced by the displacement means while the members are in mating engagement, the locking recess defining a bearing surface along which the free ends of the locking fingers will move and against which the free ends of the locking fingers will bear during displacement, the bearing surface being inclined to the axis of the member for the locking fingers to draw the two members and thus their surfaces into engagement with each other, and the one tubular member comprising two portions which are axially adjustable relatively to each other for providing a selected interference between the two members when they are drawn into sealing engagement.

21. A coupling according to claim 20, in which the female member is the member comprising the two portions, and in which the one portion comprises an annular securing portion which is axially adjustable relatively to the remaining portion of the female member, the annular securing portion including that portion of the locking recess which defines the bearing surface.

* * * * *